US012337569B2

(12) United States Patent
Galaffu et al.

(10) Patent No.: US 12,337,569 B2
(45) Date of Patent: Jun. 24, 2025

(54) SYSTEM AND METHOD FOR FORMING A COMPOSTABLE POD FOR BEVERAGES FROM A SHEET HAVING A CONTROLLED MOISTURE LEVEL

(71) Applicant: SOCIETE DES PRODUITS NESTLE S.A., Vevey (CH)

(72) Inventors: Nicola Galaffu, Ornex (FR); Karim Missoum, Pusignan (FR); Gerhard Niederreiter, Vevey (CH); Hans Wipraechtiger, Hergiswil b.W (CH)

(73) Assignee: Societe des Produits Nestle S.A., Vevey (CH)

( * ) Notice: Subject to any disclaimer, the term of this patent is extended or adjusted under 35 U.S.C. 154(b) by 0 days.

(21) Appl. No.: 18/293,230

(22) PCT Filed: Jul. 30, 2022

(86) PCT No.: PCT/EP2022/071485
§ 371 (c)(1),
(2) Date: Jan. 29, 2024

(87) PCT Pub. No.: WO2023/007021
PCT Pub. Date: Feb. 2, 2023

(65) Prior Publication Data
US 2024/0253321 A1 Aug. 1, 2024

(30) Foreign Application Priority Data

Jul. 30, 2021 (EP) .................................... 21188641
Jul. 29, 2022 (EP) .................................... 22187746

(51) Int. Cl.
B65B 29/02 (2006.01)
B31B 50/00 (2017.01)
(Continued)

(52) U.S. Cl.
CPC .......... *B31B 50/741* (2017.08); *B31B 50/006* (2017.08); *B31B 50/592* (2018.05);
(Continued)

(58) Field of Classification Search
CPC ....... B65B 29/025; B65B 47/04; B65B 9/042; B65B 57/08; B65D 85/8046; B65D 65/466; B31B 50/741; B31B 50/006; B31F 1/36
See application file for complete search history.

(56) References Cited

U.S. PATENT DOCUMENTS 4,883,451 A * 11/1989 Hoy ......................... B31F 1/08
493/396
5,659,976 A * 8/1997 Klockenkemper ... B32B 38/004
156/64

(Continued)

FOREIGN PATENT DOCUMENTS

CN 210311195 4/2020
KR 20140121676 10/2014
WO 2020031096 2/2020

Primary Examiner — Andrew M Tecco
(74) Attorney, Agent, or Firm — K&L Gates LLP

(57) ABSTRACT

The invention relates to a system (100) for manufacturing a compostable pod (900) for brewing products. Therein, the pod (900) is made from a sheet (600) made of a biodegradable cellulose-based material. The system (100) comprises at least one shaping line (200), which comprises a handling unit (300) for transferring the sheet (600) along a transfer direction (TD) through the system (100). The shaping line (200) further comprises a humidifying unit (400) for moistening at least one side of the sheet (600) with a moistening agent (401), and a forming unit (800) for shaping a part of the moistened sheet (600) into a three-dimensional shape to form a pod element (910), which defines a pod cavity (911). The shaping line (200) comprises further a humidity sensor system (500) for visually sensing a level of humidity of at (Continued)

least a section of the moistened sheet (600). Values related to the level of humidity sensed by the humidity sensor system (500) are received by a control unit (700), which is further configured to control the humidifying unit (400) based on these values. The invention also relates to a method for manufacturing a compostable pod (900), whereby a level of humidity of at least a section of the moistened sheet (600) is visually sensed and forwarded for controlling the moistening process of the at least one side of the sheet (600) correspondingly.

15 Claims, 2 Drawing Sheets

(51) Int. Cl.
*B31B 50/59* (2017.01)
*B31B 50/74* (2017.01)
*B65B 9/04* (2006.01)
*B65B 47/04* (2006.01)
*B65D 85/804* (2006.01)
*D21J 5/00* (2006.01)
*G01N 21/17* (2006.01)
*G01N 21/01* (2006.01)

(52) U.S. Cl.
CPC ............ *B65B 9/042* (2013.01); *B65B 29/025* (2017.08); *B65B 47/04* (2013.01); *B65D 85/8046* (2013.01); *D21J 5/00* (2013.01); *G01N 21/17* (2013.01); *G01N 2021/0106* (2013.01)

(56) References Cited

U.S. PATENT DOCUMENTS

| | | | | |
|---|---|---|---|---|
| 5,783,006 | A * | 7/1998 | Klockenkemper | B31F 1/36 34/421 |
| 9,039,589 | B2 * | 5/2015 | Rivera | B65B 29/025 493/143 |
| 10,161,895 | B2 * | 12/2018 | Bommarito | G01N 27/225 |
| 11,981,466 | B2 * | 5/2024 | Magnani | B31D 5/0078 |
| 2019/0225359 | A1 * | 7/2019 | Spindler | B65B 21/245 |
| 2021/0300609 | A1 * | 9/2021 | Magnani | B31D 5/0078 |
| 2024/0239538 | A1 * | 7/2024 | Magnani | B65B 61/00 |

* cited by examiner

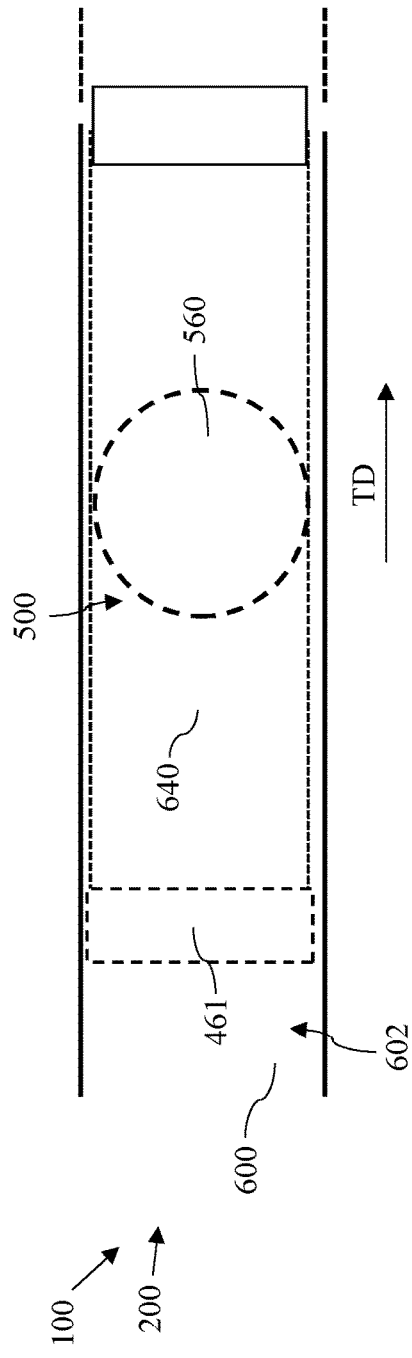
FIG 2
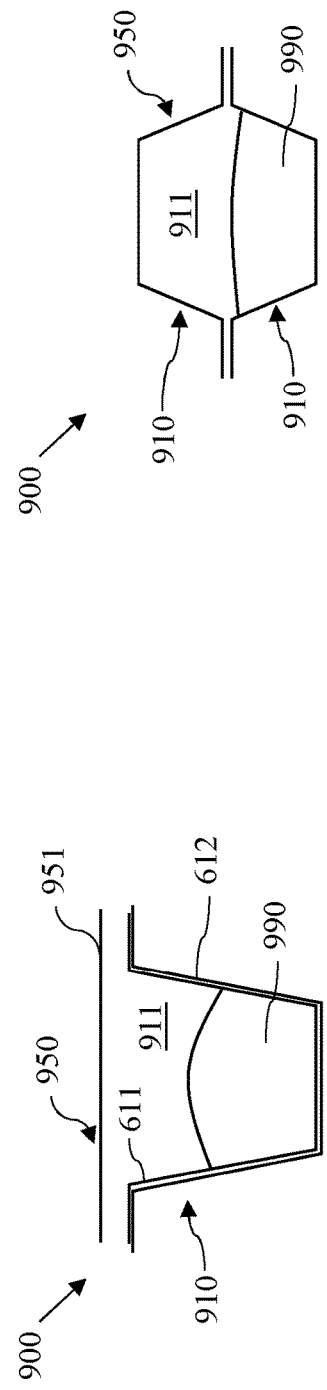
FIG 4
FIG 3

SYSTEM AND METHOD FOR FORMING A COMPOSTABLE POD FOR BEVERAGES FROM A SHEET HAVING A CONTROLLED MOISTURE LEVEL

CROSS REFERENCE TO RELATED APPLICATIONS

The present application is a National Stage of International Application No. PCT/EP2022/071485, filed on Jul. 30, 2022, which claims priority to European Patent Application No. 21188641.1, filed on Jul. 30, 2021, and European Patent Application No. 22187746.7, filed on Jul. 29, 2022, the entire contents of which are being incorporated herein by reference.

1. FIELD OF THE INVENTION

The present invention relates to a system and method for manufacturing a compostable pod for brewing products, wherein the pod is manufactured from a sheet made of a biodegradable cellulose-based material.

2. TECHNICAL BACKGROUND

Single-serve beverage containers for beverage preparation machines, such as capsules or pods, are known in the art. These beverage containers are commonly used for on demand dispensing of beverages, like coffee, tea or hot chocolate, and enjoy popularity due to fresh tasting, variability of flavours and convenience of the beverage preparation.

Typically, these known beverage containers are made of materials, for which reusing, recycling or composting is challenging, particularly after use of the beverage container. Therefore, efforts are made to replace these established materials with biodegradable or compostable materials, such as cellulose-based materials, like paper, for which the process of disposing used beverage containers is less challenging (e.g. via composting).

The use of new materials for the beverage containers requires also new manufacturing processes. For instance, in industrial production, a beverage container made from cellulose-based material may be produced from an endless (continuous) sheet of a paper material that travels through different stations of a production line. At one station, a section of the sheet is formed into a half-shell and subsequently filled with a beverage component, such as coffee, before being sealed closed with another half-shell or lid.

Therein, it was found that moistening the sheet before forming the half-shell can be beneficial for the structural integrity and shelf-life of the resulting beverage container.

For example, tearing, the creation of wrinkles or cuts in the half-shells during the forming process can be avoided by performing moistening before the forming step. An example for a manufacturing process with such moistening process can be found in WO 2020/031096 A1.

Also, it was found that the quality of the results of the forming process depends on the local distribution and amount of liquid taken up by the sheet material. For example, a high uptake of liquid by the sheet material may increase the risk of the sheet tearing or wrinkling during the forming process or while being transferred through the production line. Similarly, a low uptake of liquid by the sheet material may increase the risk of cracks in the half-shells during the forming process. As a consequence, the integrity of the beverage container cannot be ensured, thereby limiting the shelf-life of the product inside the beverage containers.

In the prior art, these problems were addressed by providing sensor systems along the production line, which are able to evaluate the extent of the water content contained inside the sheet material. For instance, known solutions rely on sensor technology that is based on a microwave radiographic method or absorbance of infrared radiation, the latter taking advantage of the circumstance that water primarily absorbs infrared radiation while being transparent for most other components of light within the visible spectrum. Other known sensor solutions for determining the extent of the water content contained inside the sheet material may be destructive or may require the sensor probe to physically contact the sheet material (e.g. gravimetric or resistance sensors).

A disadvantage of said known sensor systems is that the result of the measurement is very localized and thus, the determination of the water content inside the sheet material can only be established for small localized sections of the sheet material. Accordingly, local variations in the water content across the sheet cannot be detected. In addition, the accuracy of the measurements of known sensor systems is often too low for the requirements of the manufacturing process because these systems are more affected by radiation noise in the surroundings. Furthermore, in the process of manufacturing beverage containers, the sheet material travels through the production line at speeds that make it difficult to take advantage of all benefits of infrared or microwave technology. In comparison, infrared sensor systems are typically used in static applications, such as building sites to determine the water content in bricks or flooring, and the accuracy of the measurement is primarily reliant on the object of interest being immobile. In addition, the movement of the sheet through the production line makes it difficult to allocate the result of a measurement to the respective section of the sheet material with sufficient accuracy. Accordingly, a measured section of the sheet may be of little or no relevance for the forming process due to such misalignments. Another disadvantage of the known sensor systems is the delay between taking a measurement and determining the extent of the water content contained inside the sheet material. Accordingly, it may become necessary to reduce the transport speed of the sheet to reduce lag times and to synchronize the measurement process with the manufacturing processes. Moreover, methods that require direct contact between the sensor probe and the sheet material, or necessitate to destructively analyse samples cut out from the sheet are generally considered unsuitable for manufacturing on an industrial scale.

Consequently, accurate and optimised control of the moistening process is difficult to achieve due to the above described problems surrounding the measurement of the water content inside the sheet material. Thus, the risk of the structural integrity of the beverage container being compromised during the forming step is increased since the moisture level at the forming step cannot be accurately monitored and set. Accordingly, the shelf-life and quality of the so produced beverage containers cannot be ensured.

Therefore, it is an object of the present invention to provide a system and a method for manufacturing a pod made from a compostable material, in which the structural integrity and shelf-life of the produced pod can be improved and ensured. Therein, it is a particular object of the invention to improve the speed, accuracy and reliability of measuring the moisture level of any liquid contained in the sheet material, as well as to improve the control of the moistening step in the manufacturing system and process.

These and other objects, which become apparent upon reading the description, are solved by the subject-matter of the independent claims. The dependent claims refer to preferred embodiments of the invention.

3. SUMMARY OF THE INVENTION

A first aspect of the invention relates to a system for manufacturing a compostable pod for brewing products. The system is (suitable or configured) for manufacturing said pod from a sheet made of a biodegradable cellulose-based material.

Therein, the term "pod" may be understood, for example, as any (closed) container for preparing a beverage in a beverage production machine (e.g. a capsule). A beverage preparation may comprise solving, brewing or percolating a substance enclosed inside the pod to produce a brewing product, such as coffee or tea, for instance.

The term "sheet" may be understood, for example, as a large, thin, flat, piece of material.

For example, the sheet may be supplied in a dry state, i.e. having a maximum level of (relative) moisture or humidity in the range from 2% to 8%, preferably 4% or 5%.

Moreover, the term "compostable" may be understood as meaning that a material may be substantially broken down into organic matter within a few weeks or months when it is composted. This may be accomplished in industrial composting sites and/or home composters. Specific conditions relating to wind, sunlight, drainage and other factors may exist at such sites. At the end of a composting process, the earth may be supplied with nutrients once the material has completely broken down. International standards, such as EU 13432 or US ASTM D6400, provide a legal framework for specifying technical requirements and procedures for determining compostability of a material. In comparison, a "biodegradable" material may be understood as any material that can be broken down into environmentally innocuous products by (the action of) living things (such as microorganisms, e.g. bacteria, fungi or algae). This process can take place in an environment with or without the presence of oxygen (aerobic/anaerobic).

The system comprises at least one shaping line, which comprises a handling unit for transferring the sheet along a transfer direction through the system. The shaping line comprises further a humidifying unit for moistening at least one side of the sheet with a moistening agent.

Therein, the term "humidifying unit" may be understood, for example, as a component of the shaping line capable (or configured) for bringing (applying, or introducing) a moistening agent (liquid, solution) into or onto the sheet. For this, the moistening agent may be applied directly onto the sheet or by the humidifying unit making a carrier medium (e.g. ambient air) humid or damp that can transfer moisture onto the sheet.

The shaping line comprises a forming unit for shaping a part of the moistened sheet into a three-dimensional shape to form a pod element defining a pod cavity.

Therein, the term "shaping" may be understood, for example, as using the characteristic of a material being formable, malleable, and/or pliable to change its (three-dimensional) shape (with or without the support of additional tools, and/or preferably with or without the application of heat). Further, the term "moistened" may be understood, for example, as the sheet material being subjected to the moistening agent and the moistening agent being present in the material. Preferably, the moistened sheet material may carry an amount of the moistening agent.

The at least one shaping line further comprises a humidity sensor system for visually sensing a level of humidity of at least a section of the moistened sheet. Preferably, said section may correspond at least partially with the part to be shaped.

Therein, the expression "visually sensing" may be understood as sensing similar to the human eye. For instance, it may be understood as optical sensing, i.e. sensing based on information carried by light within the visible spectrum. The humidity sensor system may be suitable (configured) for capturing an at least two-dimensional (optical, visual) image, by which a light intensity distribution (for defined wavelengths) can be detected.

Furthermore, the expression "level of humidity" (moisture level) may be understood, for example, as a numerical quantification of a primarily liquid substance (or moisture, and/or humidity) contained inside the sheet material. For example, it is conceivable that the level of humidity may be an indication of the (liquid and/or gaseous) water content in the paper, and/or the relative humidity of the (paper) sheet material. Therein, water content (or moisture content) may be understood, for example, as the amount of (liquid and/or gaseous) water contained in a solid material (e.g. measured as a weight in Gramm). From this it becomes clear that in this specification, the terms "moisture" and "humidity" may be used interchangeably unless explicitly stated otherwise.

For example, the level of humidity (moisture level) may be expressed as absolute humidity. For instance, the liquid (moistening agent) content in the material could be measured in weight per volume ($g/m^3$). Alternatively or additionally, the level of humidity (moisture level) may be expressed as relative humidity. For instance, the liquid content may be measured as ratio between a measured moistening agent content and the maximum quantity of the liquid content absorbable in the material (e.g. ratio expressed as percentage).

The at least one shaping line further comprises a control unit configured to receive values related to the level of humidity sensed by the humidity sensor system, and to control the humidifying unit based on these values.

In other words: With the configuration of the present invention, it becomes possible to provide a manufacturing system that is capable of producing from a cellulose-based sheet material a compostable pod for brewing products. For this, the system comprises a shaping line, which is capable of (sequentially) performing various functions or operations involved within the pod production (manufacturing) process, which are interlinked such that a compostable pod with reliable and high structural integrity can be achieved. For instance, a handling unit is provided that is suitable for (linearly) transferring (transporting, moving, dragging, conveying) the sheet through the system. Further, a humidifying unit is provided for applying a (liquid and/or gaseous) moistening agent onto at least one side of the sheet. Therein, for example, the moistening agent may be any substance or liquid, such as water, distilled water or any aqueous solution, which preferably may be suitable for reducing the sheet material inherent rigidity of the pod for the shaping step. Thereby, the shaping process of the pod element (or of the pod body or of at least a part of the pod) is supported because, in the forming unit, the shaping process can be performed on a moistened section of the sheet, which is beneficial for avoiding pod integrity breaches resulting from the forming process. The shaping line further comprises a humidity sensor system. Thereby, it is possible to determine the quantity, location and extent of the moistening agent inside the sheet. Therein, visual sensing facilitates short measuring times, measuring a defined area, as well as the ability of the light to enter deep inside the sheet material. Accordingly, the size of the measured area, the measurement speed and the accuracy of the measurement can be improved in comparison to the sensor methods known from the prior art. This allows the control unit to adapt the moistening process in the humidifying unit more quickly, accurately and less dependent on highly localized measurements. The control unit is configured to evaluate values related to the level of humidity, which may be raw values determined by the sensor (e.g. intensity values of a light of a certain wavelength), calculated, converted or weighed values, or they may be already the final result of an analysis of the measured values performed by the humidity sensor system. Since the accuracy, speed and quality of information contained in the values can be improved, the control of the moistening process can be completed more accurately, timely and adapted to a momentary situation than what was achieved in prior art solutions. In particular, it becomes possible to monitor and to control the manufacturing process in real-time (i.e. a response of the system within specified time constraints, such as reacting within half of the time needed by the section of the sheet to travel between two consecutive stations, may be guaranteed).

Thereby, it is possible to manufacture a pod made from a compostable material, in which the structural integrity and shelf-life of the produced pod is improved and ensured. Thus, the system of the present invention overcomes the disadvantages of the prior art.

According to a preferred embodiment, the humidity sensor system may comprise an optical instrument to capture a visual image of at least the section of the moistened sheet. The visual image may represent the level of humidity. For example, the optical instrument may be a (high resolution) camera. Preferably, the resolution of the optical camera may be in the range of 5 million pixels to 20 million pixels, preferably 12 million pixels. The visual image may comprise a plurality of pixels. Preferably, each of the received (level of humidity related) values may be related to one or a number of the pixels. Preferably, the visual image may have a resolution of at least 100 pixels per inch (PPI), preferably at least 300 PPI, more preferred about 900 PPI (or, expressed differently, 30 micrometres per pixel).

Thereby, it is possible to scan the section of the sheet in at least two dimensions and with a high resolution so that an accurate representation of the quantity and quality of the moisture distribution in the sheet can be determined. Accordingly, it is possible to tailor the moistening process more closely to the requirements of the forming process due to the improved quality and informative value of the acquired measurement data.

According to a preferred embodiment, the humidity sensor system may comprise at least one light source. For example, the light source may be an LED light source for emitting light of one or more defined wavelengths within the visible spectrum.

Therein, the expression "visible spectrum of light" may be understood as light having a wavelength between 380 nanometres (e.g. violet) and 700 nanometres (e.g. red), preferably between 380 nanometres and 900 nanometres (e.g. near infrared).

Preferably, the light source may be arranged such that the emitted light is directed onto at least the section of the moistened sheet so as to be reflected. For example, the light source may be arranged such that the emitted light may be reflected towards the optical instrument to capture the reflected light as the visual image.

Thereby, it is possible to provide the humidity sensor system with an active light source, by which a defined light can be emitted and the response (e.g. absorbance, reflectance, phase shift) between the emitted light and the liquid contained in the section of the material to be measured can be recorded. With such configuration, it is possible to reduce or even eliminate the impact of radiation noise on the accuracy and validity of the measurement. Moreover, by emitting light of a variety of different wavelengths, it becomes possible to detect the reflectance intensities of the material for different wavelengths. This allows detecting the moisture level for various compositions of moistening agents. For example, the moistening agent may comprise a surface active agent or ingredient that may cause the reflectance intensities of the sheet material at a certain wavelength to be different from a sheet material being moistened by water only. In addition, it is possible to create a reflectance profile or signature for the observed section, which can be compared to reference signatures of various moisture levels (within the same material). Accordingly, it becomes possible to tailor the system to the respective application and to allow the use of different moistening agents. Therein, it is also conceivable that the moistening agent may comprise a substance improving the accuracy of the reflectance or absorbance measurement further by responding to a certain wavelength of the emitted light in a particular manner.

According to a further preferred embodiment, the humidity sensor system may be arranged above the sheet or the section of the moistened sheet to be visually sensed. For instance, at least the optical instrument, if present, may be arranged in this manner.

Therein, "above" may be understood, for example, as perpendicular with respect to the sheet surface and/or the transfer direction (e.g. with respect to gravity).

Thereby, it is possible to acquire data from relevant sections of the sheet in advantageous manner.

According to a preferred embodiment, the humidity sensor system may be positioned downstream of the humidifying unit and preferably upstream of the forming unit with respect to the transfer direction. For instance, at least the optical instrument may be arranged in this manner.

Thereby, it is possible to determine the result of the moistening step (immediately) and to adapt the moistening process based on the so acquired data.

According to a further preferred embodiment, the control unit may be configured to compare the received (level of humidity related) values with defined reference values. Alternatively or additionally, the control unit may be configured to control the humidifying unit based on the comparison between the received (level of humidity related) values and the defined reference values.

Thereby, it is possible to determine any differences between a desired moisture level in the sheet material and the actual (measured) moisture level. For example, statistical or machine learning methods may be applied, e.g. Principal Component Analysis (PCA).

According to a preferred embodiment, the system or the control unit may comprise a data storage unit for storing the defined reference values. Alternatively or additionally, the system or the control unit may comprise a communication port for retrieving the defined reference values and/or the received (level of humidity related) values.

Thereby, it is possible to provide the system with a connection to data networks (e.g. internet) or databases for storing, analysing and evaluating the acquired data and adapted control settings. This facilitates continuous improvements of the control algorithm used at the control unit and all operations completed within the system.

According to a further preferred embodiment, the humidifying unit may be arranged to moisten only one side of the sheet. For example, the humidifying unit may be arranged to moisten only a lower side of the sheet when the sheet is horizontally (e.g. with respect to gravity) transferred through the humidifying unit. Preferably, the humidifying unit may be arranged on an opposite side of the sheet than the humidity sensor system. Preferably, the humidifying unit may comprise a scraper element for removing excess liquid from the sheet, which preferably may be arranged at a downstream end section of the humidifying unit with respect to the transfer direction.

Thereby, the risk of water drops falling into the sensing part of the humidity sensor system, and so altering the accuracy and validity of the measurement can be reduced. Moreover, by applying the moistening agent on an opposite side of the sheet to the position of the sensor, it can be ensured that the moistening agent is sufficiently soaked into the sheet material, thereby improving the reliability of the measurement and reducing the risk of measuring local variations in the liquid concentration resulting from the moistening process in the humidifying unit leading to data outliers.

According to a preferred embodiment, the humidifying unit may comprise an immersion unit for immersing the at least one side of the sheet in the moistening agent. Alternatively or additionally, the humidifying unit may comprise a spraying unit for spraying the moistening agent on the at least one side of the sheet. Alternatively or additionally, the humidifying unit may comprise a steam unit, preferably a cold steam unit, for applying the moistening agent onto the at least one side of the sheet. Alternatively or additionally, the humidifying unit may comprise a roll transfer unit for transferring the moistening agent from a reservoir onto the at least one side of the sheet.

Thereby, the moistening agent can be applied in various ways onto the sheet material.

According to a further preferred embodiment, the system may further comprise a pre-drying unit for drying the sheet before reaching the forming unit. Preferably, the pre-drying unit may be suitable and/or configured for drying at least part of the sheet (on the at least one side). Preferably, the control unit may be further configured to control the pre-drying unit based on these values. Alternatively or additionally, the system may further comprise a final drying unit for drying the pod element. Preferably, the pod element may be the shaped (part of the) sheet. The control unit may be further configured to control the final drying unit based on these values.

Thereby, it is possible to reduce the level of moisture contained in the moistened section of the sheet before reaching the forming unit. Therein, the control of the pre-drying unit can be adapted based on the results of the measurements completed by the humidity sensor system. Thereby, it can be ensured that the moistened section of the sheet can be shaped in the forming unit having an optimal moisture level.

According to a preferred embodiment, the system may further comprise a filling unit for placing an amount of a brewing material into the pod cavity of the pod element. For example, the filling unit may be arranged downstream of the final drying unit with respect to the transfer direction.

Therein, the brewing material may be a substance, such as any type of (solid semi-solid or jellified, at least partially soluble and/or percolate-able) matter of a particular or definite chemical constitution. Examples for such substances may be roasted ground coffee, instant coffee, tealeaves, a chocolate product, dehydrated edible substances, and/or combinations thereof.

Thereby, it is possible to dry the pod element before reaching the filling unit so that the pod is filled in a dry state, which is beneficial for the shelf-life of the resulting pod.

According to a further preferred embodiment, the system may further comprise a joining unit for joining a closing element to the pod element to close the pod cavity (preferably around the amount of brewing material). For example, the closing element may be a lid or another one of the pod elements. Preferably, the pod elements may be joined such that their cavities together form a closed pod cavity. For this, the system may comprise two of the shaping lines, each for forming a pod element, and said joining unit for joining the two pod elements to form the pod cavity.

Thereby, it is possible to provide a physical (and preferably sealing) connection between the pod element and the respective closing element. The connection may be achieved by heat sealing or ultrasonic sealing. Accordingly, it is possible to provide a gas tight enclosure or encapsulation of the brewing material inside the pod cavity. Thereby, the integrity and shelf-life of the pod can be ensured.

According to a further preferred embodiment, the sheet may be an endless sheet. The sheet may preferably be provided from a reel. For this, for example, the system may further comprise a conveying unit for unrolling the sheet.

Thereby, it is possible to provide the sheet in a manner particularly suitable for industrial manufacturing. In particular, sequential processing at different stations is improved by providing the sheet as a continuous sheet. For example, the sheet may longitudinally extend in a continuous manner. In particular, the sheet may be suitable for being connected with other such sheets at an end section to form a seemingly "endless" sheet in the manufacturing process.

According to a preferred embodiment, the sheet may have gas barrier properties.

Therein, a gas barrier may be understood, for example, as the ability to reduce or eliminate gaseous substances passing through the sheet (material). For instance, the sheet may have a oxygen barrier with an oxygen transmission rate (OTR) below 5 $cm^3/m^2/day$. However, OTR values may be subject to the specifics of the material used for the sheet. Generally, the OTR may be a measure of the amount of oxygen gas that passes through a substance over a defined period. For example, OTR may be measured using known methods specified in industrial standards, such as DIN 53380-3, ASTM D1434 or ISO 2872.

On this aspect, it is noted that applying too much moistening agent onto the sheet can lead to the effectiveness of the oxygen barrier to decrease (thus, OTR to increase) due to irreversible swelling of the fibres in the sheet material, for instance. Accordingly, the humidity sensor system may preferably be arranged such that the moisture level may be sensed before the oxygen barrier may be irreversibly damaged or altered.

The sheet may have a single-layered structure made of a cellulose-based material having the gas barrier properties. Alternatively, it is also conceivable that the sheet may have a multi-layered structure, comprising a paper layer made of a cellulose-based material and a barrier layer having the gas barrier properties. Preferably, the paper layer may form the at least one side and/or the above-mentioned lower side of the sheet.

By providing the sheet with a gas barrier, the shelf-life of the pod can be improved.

A further aspect of the present invention relates to a method for manufacturing a compostable pod, the pod being (configured and/or suitable) for brewing products. The method comprises the step of transferring a sheet made of a biodegradable cellulose-based material along a transfer direction through the above-described system. For example, the biodegradable cellulose-based material may preferably have gas barrier properties. At least one side of said sheet is moistened with a moistening agent. Part of the moistened sheet is shaped into a three-dimensional shape to form a pod element defining a pod cavity. Preferably, the pod element may be dried. The method further comprises the step of visually sensing a level of humidity of at least a section of the moistened sheet. Values related to the sensed level of humidity are received. The (step, process, result, or effect of) moistening of the at least one side of the sheet is controlled based on these values.

All of the definitions and effects described above for the system are equally applicable to the method of the invention. The system is suitable for performing the method of the present invention.

With the configuration of the method of the invention, it is possible to provide from a sheet material a compostable pod having a high and reliable structural integrity and shelf-life. This is possible because the method allows to measure and adapt the liquid content in the sheet so that shaping the sheet into the pod shape can be improved.

According to a preferred embodiment, the step of visually sensing may comprise capturing a visual image of at least the section of the moistened sheet representing (showing, or indicative of) the level of humidity. Alternatively or additionally, the step of visually sensing may comprise the steps of emitting light of one or more defined wavelengths within the visible spectrum onto at least the section of the moistened sheet, and capturing the reflected light as the visual image.

Thereby, the accuracy and reliability of the acquired data relating to the moisture level can be improved while measurement times can be reduced. In particular, it becomes possible to monitor the manufacturing process in real-time.

According to a further preferred embodiment, the step of controlling the (step, process, result, or effect of) moistening may comprise the steps of comparing the received (level of humidity related) values with defined reference values, and controlling (e.g. adapting) the moistening based on the comparison between the received (level of humidity related) values and the defined reference values.

Thereby, the control of the moisture level can be improved. In particular, due to the measurement, it becomes possible to control the manufacturing process in real-time.

According to a preferred embodiment, the method may further comprise the step of placing an amount of a brewing material into the cavity of the pod element. Alternatively or additionally, the method may further comprise the step of joining a closing element to the pod element to close the cavity. Therein, the step of joining may preferably comprise the step of joining a lid as the closing element. Alternatively, the step of joining may preferably comprise the step of joining another one of the pod elements as the closing element, wherein preferably the pod elements may be joined such that their cavities together form a closed pod cavity.

Thereby, it is possible to provide a pod with a beverage ingredient and seal the pod from the outside. Thus, the pod can be provided with a relatively long shelf-life.

4. BRIEF DESCRIPTION OF DRAWINGS

Further features, advantages and objects of the invention will become apparent for the skilled person when reading the following detailed description of embodiments of the invention and when taking in conjunction with the figures of the enclosed drawings. In case numerals have been omitted from a figure, for example for reasons of clarity, the corresponding features may still be present in the figure.

FIG. 2 shows a schematic top view of the shaping line and system of FIG. 1.

FIG. 3 shows a schematic sectional side view of a pod manufactured with the system and method according to a further embodiment of the invention.

FIG. 4 shows a schematic sectional side view of a pod manufactured with the system and method according to a further embodiment of the invention.

5. DETAILED DESCRIPTION

Figure 1:
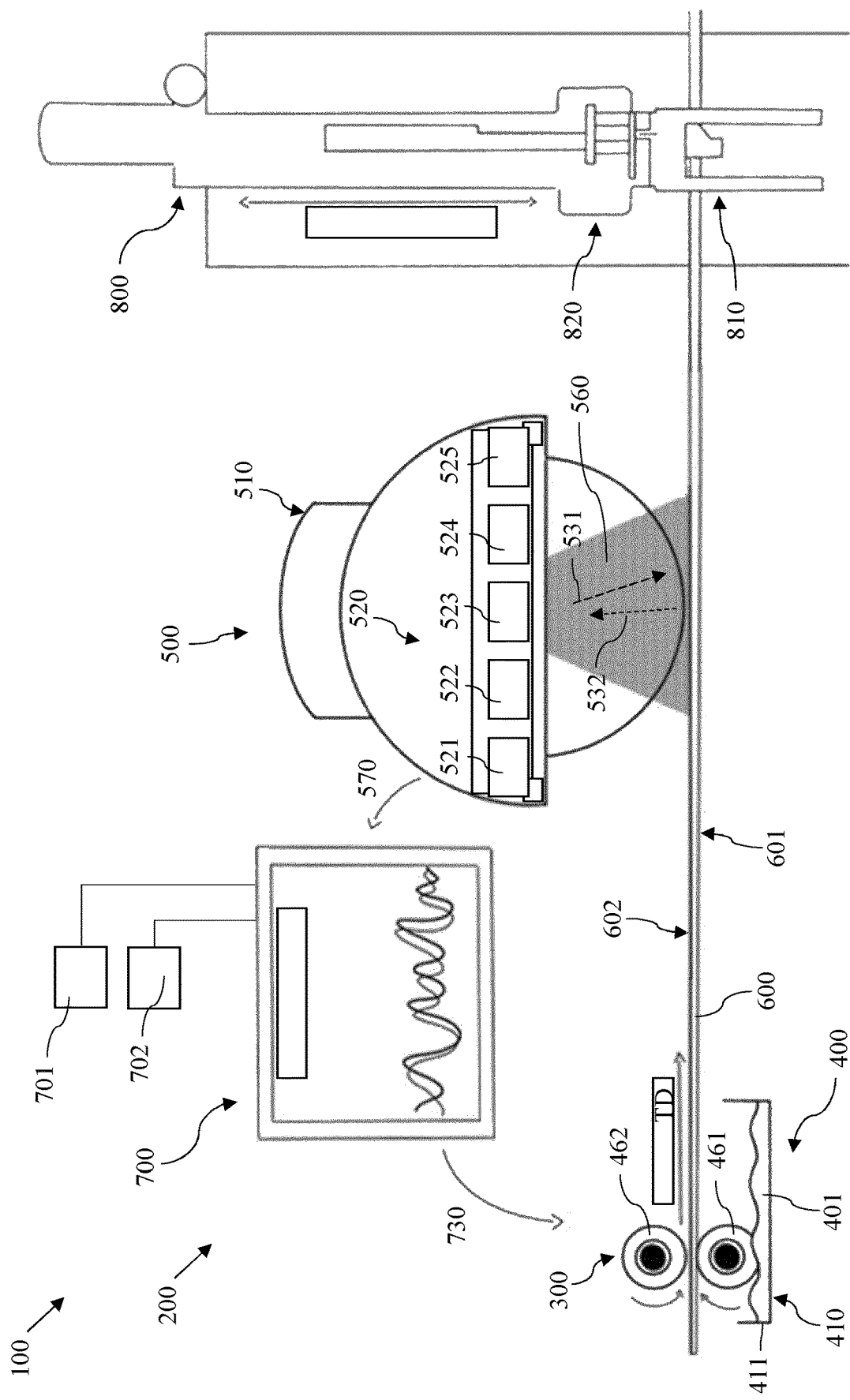
FIG. 1 shows a schematic side view of a shaping line of a pod manufacturing system according to an embodiment of the invention.

FIGS. 1 and 2 show different views and aspects of an embodiment of the system 100 and method for manufacturing a compostable pod 900 for brewing products according to the present invention. FIGS. 3 and 4 show aspects of different embodiments of the compostable pod 900 manufactured with the system 100 and the method according to the present invention.

The system 100 is configured for manufacturing a compostable pod 900 from a sheet 600. FIGS. 1 and 2 show the system 100 and some of the components exemplarily. FIGS. 3 and 4 show examples of the pod 900 producible with the system 100.

The sheet 600 is made of a biodegradable cellulose-based material. For example, the cellulose-based material may comprise cellulosic fibres, paper, paperboard, a cellulosic pulp for being molded, a cellulose nanofibres sheet or film, airlaid cellulose and/or delignified wood. For instance, the sheet 600 may be made of paper comprising (other) biodegradable material. The material of the sheet 600 may provide a barrier against moisture and/or gas. For this, the sheet 600 may have, for example, a single-layered structure of cellulose-based material, the layer being sufficiently thick or composed to provide the gas barrier properties. FIGS. 1, 2 and 4 exemplarily illustrate the use of the sheet 600 having a single layer. Alternatively, the sheet 600 may have, for example, a multi-layered structure with a paper layer 611 made of a cellulose-based material, and a barrier layer 612 with the gas barrier properties. The use of such material configuration of the sheet 600 is exemplarily shown in FIG. 3.

For the purpose of industrially manufacturing the pod 900, the sheet 600 may be provided as an endless sheet, for example. This type of sheet 600 may be provided from a reel and the system 100 may comprise a conveying unit for unrolling the sheet 600 from said reel and for introducing the sheet 600 into the system 100 (not illustrated). However, it is also conceivable to provide the sheet 600 as an individual blank sheet. Preferably, the sheet 600 may have a thickness between 50 micrometres and 200 micrometres, more preferred between 120 micrometres and 130 micrometres.

The system 100 comprises at least one shaping line 200. FIGS. 1 and 2 exemplarily illustrate an embodiment of the shaping line 200. For instance, the shaping line 200 may comprise a series of stations each providing the functionality required for manufacturing the pod 900. For example, a section of the sheet 600 may pass each of the stations in sequential order. The system 100 may comprise one or more of the shaping line 200.

The shaping line 200 comprises a handling unit 300 for transferring the sheet 600 along a transfer direction TD through the system 100. In FIGS. 1 and 2, the handling unit 300 is exemplarily illustrated as two rollers 461, 462, which may be arranged opposite to each other with respect to the sheet 600. However, it is also conceivable that the handling unit 300 may be provided by a conveyor band, pusher or moving clamps. Moreover, additional handling elements (e.g. rollers) of the handling unit 300 may be provided at various locations along the transfer direction TD to ensure a continuous transport of the sheet 600 through the system 100. Preferably, the sheet 600 may be linearly moved along the transfer direction TD. The sheet 600 may be transported within the system 100 horizontally (as illustrated exemplarily in FIGS. 1 and 2) or vertically (not illustrated).

The shaping line 200 further comprises a humidifying unit 400 for moistening at least one side of the sheet 600 with a moistening agent 401. FIGS. 1 and 2 show an exemplary embodiment of the humidifying unit 400.

As shown in FIGS. 1 and 2, the humidifying unit 400 may comprise a roll transfer unit 410 for transferring the moistening agent 401 from a reservoir 411 onto the at least one side of the sheet 600. For instance, the moistening agent 401 may be applied by the roller 461 onto the lower side 601 of the sheet 600, wherein preferably the roller 461 may be at least partially immersed in the moistening agent 401. The roller 461 may then get into contact with the sheet 600 and thereby may bring the moistening agent 401 into the sheet material within a defined section of the sheet 600, which may be referred to as a moistened section 640 of the sheet 600 (FIG. 2). For instance, the water content in the moistened section 640 may be higher than in the rest of the sheet 600 (e.g. part before the roller 461). Preferably, the humidifying unit 400 may be arranged to moisten only one side of the sheet 600. This is exemplarily illustrated in FIGS. 1 and 2, where only the lower side 601 of the sheet 600 may be moistened by the humidifying unit 400. Thereby, excess liquid may leave the lower side 601 and may be returned into the reservoir 411. However, it is also conceivable that the upper side 602 and the lower side 601 of the sheet 600 may be moistened.

In addition, other embodiments of the humidifying unit 400 are conceivable, of which the following are briefly discussed: For instance, the humidifying unit 400 may comprise an immersion unit for immersing the at least one side of the sheet 600 in the moistening agent 401. Alternatively or additionally, the humidifying unit 400 may comprise a spraying unit for spraying the moistening agent 401 on the at least one side of the sheet 600. Alternatively or additionally, the humidifying unit 400 may comprise a (cold) steam unit for applying the moistening agent 401 onto the at least one side of the sheet 600.

Preferably, the sheet 600 may be provided such that the barrier layer 612 may be arranged on the opposite side to the humidifying unit 400, for example, in order to facilitate sufficient uptake of the moistening agent 401 during the moistening process. In other words, the paper layer 611 may preferably be the at least one side and/or the lower side 601 of the sheet 600.

The moistening agent 401 may be (distilled) water or an aqueous solutions, for example.

The shaping line 200 further comprises a forming unit 800 for shaping a part of the moistened sheet 600 into a three-dimensional shape to form a pod element 910, which defines a pod cavity 911. Therein, preferably the moistened section 640 of the sheet 600 may be the part for shaping, and accordingly, may be subjected to the shaping process. FIG. 1 exemplarily shows an embodiment of the forming unit 800. In this example, the forming unit 800 may comprise forming tools, such as a forming die 810 and a movable corresponding stamp 820 for forming the pod element 910 with the pod cavity 911.

The body of the pod 900 may be formed by the pod element 910, for example. As exemplarily illustrated in FIGS. 3 and 4, the pod element 910 may define the pod interior with the pod cavity 911.

The shaping line 200 further comprises a humidity sensor system 500 for visually sensing a level of humidity of at least a section of the moistened sheet 600. FIGS. 1 and 2 show an embodiment of the humidity sensor system 500 exemplarily. Preferably, the humidity sensor system 500 may sense the level of humidity at a section of the sheet 600 that may correspond at least partially with the part to be shaped in the forming unit 800. This is exemplarily illustrated in FIGS. 1 and 2, whereby the moistened section 640 is (continuously in time and space) examined by the humidity sensor system 500.

For instance, the humidity sensor system 500 may comprise an optical instrument 510, such as a (high resolution) camera, to capture a visual image of at least the section of the moistened sheet 600 representing the level of humidity. This is exemplarily indicated in FIGS. 1 and 2. The so captured visual image may comprise a plurality of pixels. Each of the received (level of humidity related) values may be related to one or more pixels.

The humidity sensor system 500 may comprise a light source 520 for emitting light within the visible spectrum. For this, a single light source 520 may be provided. FIG. 1 illustrates exemplarily that the humidity sensor system 500 may also comprise a plurality of LED light sources 521, 522, 523, 524, 525, each being provided for emitting light of one or more defined wavelengths within the visible spectrum. For instance, wavelengths around 380 nanometres, 450 nanometres, 520 nanometres, 590 nanometres 660 nanometres and/or 700 nanometres may be used. Alternatively, or additionally, the light source 520 (having one or multiple light sources) may emit light having a continuous spectrum within the visible spectrum (i.e. a continuous sweep). The light source 520 may be arranged such that the emitted light 531 is directed onto at least the section of the moistened sheet 600 so as to be reflected towards the optical instrument 510 to capture the reflected light 532 as the visual image. This is exemplarily illustrated in FIG. 1.

Preferably, the optical instrument 510 may be capable of acquiring data within a defined measuring window 560. This is exemplarily illustrated in FIGS. 1 and 2. Preferably, the measuring window 560 may have any shape or form. For example, the measuring window 560 may have a diameter between 2 cm and 20 cm.

The humidity sensor system 500 or at least the optical instrument 510 may be arranged above the sheet 600 or the section of the moistened sheet 600 to be visually sensed. This is exemplarily illustrated in FIGS. 1 and 2. Alternatively or additionally, the humidity sensor system 500 or at least the optical instrument 510 may be positioned downstream of the humidifying unit 400 and preferably upstream of the forming unit 800 with respect to the transfer direction TD. FIGS. 1 and 2 show this exemplarily. Preferably, the humidifying unit 400 and humidity sensor system 500 may be arranged on opposite sides with respect to the sheet 600. This is exemplarily shown in FIGS. 1 and 2.

The shaping line 200 further comprises a control unit 700 configured to receive values related to the level of humidity sensed by the humidity sensor system 500, and to control the humidifying unit 400 based on these values. Therein, the control unit 700 may be configured to compare the received values with defined reference values, and to control the humidifying unit 400 based on the comparison between the received values and the defined reference values.

For example, the sheet 600 may be considered at a good moisture level with the level of (relative) moisture or humidity of the sheet material being in the range from 9% to 40%, preferably 12% to 18%, and more preferred 12% to 16%. However, the present invention is not limited to these specific values as they may vary depending on the respective sheet material.

Preferably, the control unit 700 may be configured to control and/or adapt a number of different parameters and components of the shaping line 200. For instance, the control unit 700 may be configured to adapt the travelling speed of the sheet 600, the composition of the moistening agent 401, the rotational speed of the rollers 461, 462 and/or the temperature of the forming tools 810, 820 provided in the forming unit 800. For this, the system 100 or the control unit 700 may comprise a data storage unit 701 for storing the defined reference values. Alternatively or additionally, the system 100 or the control unit 700 may comprise a communication port 702 for retrieving the defined reference values and/or the received values from an external source. The control unit 700 may preferably be connected with all of the elements of the shaping line 200, in particular the handling unit 300, the humidifying unit 400 the forming unit 800, the humidity sensor system 500 and/or other components described in the following. The information link (connection) between the respective components is exemplarily illustrated by arrows 730 and 570, which indicate exemplarily a data connection between the control unit 700 and the handling unit 300, and the control unit 700 and the humidity sensor system 500.

For instance, the system 100 may further comprise a pre-drying unit for drying the sheet 600 before reaching the forming unit 800. Preferably, at least the moistened part of the sheet 600 may be dried by the pre-drying unit. Alternatively, or additionally, the system 100 may further comprise a final drying unit for drying the pod element 910. Alternatively or additionally, the system 100 may further comprise a filling unit for placing an amount of a brewing material 990 into the pod cavity 911 of the pod element 910. Therein, the filling unit may be arranged downstream of the final drying unit with respect to the transfer direction TD, for instance. However, it is also conceivable the filling unit may be part of the forming unit 800. Alternatively, or additionally, the system 100 may comprise a joining unit for joining a closing element 950 to the pod element 910 to close the pod cavity 911 around the amount of brewing material 990.

FIGS. 3 and 4 show different examples of embodiments of the closing element 950. For instance, the closing element 950 may be a lid 951, such as exemplarily illustrated in FIG. 3. Alternatively, the closing element 950 may be another one of the pod elements 910, wherein preferably the pod elements may be joined such that their cavities 911 together form a closed pod cavity 911. For this, it is conceivable that the system 100 may be provided with two shaping lines 200, each for forming a pod element 910, and with said joining unit for joining the two pod elements 910.

A further aspect of the invention relates to a method for manufacturing a compostable pod, such as the pod 900 described above. FIGS. 1 and 2 show steps of the method.

For instance, in the method, a sheet, which is made of a biodegradable cellulose-based material and preferably may have gas barrier properties, such as the above-described sheet 600, is transferred along the transfer direction TD through the system 100.

At least one side of said sheet 600 is moistened with a moistening agent, such as the above-described moistening agent 401.

A level of humidity of at least a section of the moistened sheet 600, such as the moistened section 640, is visually sensed so that values related to the sensed level of humidity can be received. Therein, the step of visually sensing may comprise capturing a visual image of at least the section of the moistened sheet 600 representing the level of humidity. Alternatively, the step of visually sensing may comprise the step of emitting light 531 of one or more defined wavelengths within the visible spectrum onto at least the section of the moistened sheet 600 and capturing the reflected light 532 as the visual image.

A part of the moistened sheet 600 is shaped into a three-dimensional shape to form a pod element defining a pod cavity, such as the above-described pod element 910 with the pod cavity 911. It is conceivable to dry the pod element 910 after the shaping. However, the pod element 910 may be dried at various other stages throughout the manufacturing process.

The process (step) of moistening of the at least one side of the sheet 600 is controlled based on the values acquired in the visually sensing step. Therein, the step of controlling the moistening may comprise comparing the received values with defined reference values, and controlling the moistening based on the comparison between the received values and the defined reference values.

The method may further comprise the step of placing an amount of a brewing material, such as the above described brewing material 990, into the cavity 911 of the pod element 910. The method may further comprise the step of joining a closing element, such as the above-described closing element 950, to the pod element 910 to close the cavity 911. This is exemplarily illustrated in FIGS. 3 and 4. For instance, the step of joining may comprise joining a lid 951 as the closing element 950 to the pod element 910. Alternatively, another one of the pod elements 910 may be joined as the closing element 950. Thereby, the pod elements 910 may be joined such that their cavities 911 together form a (one) pod cavity 911, which is closed.

The invention is not limited by the embodiments as described hereinabove, as long as being covered by the appended claims. All features of embodiments described hereinabove can be combined in any possible way and can be provided interchangeably.

The invention claimed is:

1. System for manufacturing a compostable pod for brewing products from a sheet made of a biodegradable cellulose-based material, the system comprising at least one shaping line, which comprises:
a handling unit for transferring the sheet along a transfer direction through the system;
a humidifying unit for moistening at least one side of the sheet with a moistening agent; and
a forming unit for shaping a part of the moistened sheet into a three-dimensional shape to form a pod element defining a pod cavity;

wherein the at least one shaping line further comprises:
a humidity sensor system for visually sensing a level of humidity of at least a section of the moistened sheet, and
a control unit configured to receive values related to the level of humidity sensed by the humidity sensor system, and to control the humidifying unit based on these values.

2. System according to claim 1, wherein the humidity sensor system comprises an optical instrument to capture a visual image of at least the section of the moistened sheet representing the level of humidity.

3. System according to claim 1, wherein the humidity sensor system comprises a light source for emitting light of one or more defined wavelengths within the visible spectrum, wherein the light source is arranged such that the emitted light is directed onto at least the section of the moistened sheet so as to be reflected.

4. System according to claim 1, wherein the humidity sensor system is arranged on an opposite side to the humidifying unit with respect to the sheet or the section of the moistened sheet to be visually sensed, and/or
wherein the humidity sensor system is positioned downstream of the humidifying unit.

5. System according to claim 1, wherein the control unit is configured to compare the received values with defined reference values, and to control the humidifying unit based on the comparison between the received values and the defined reference values.

6. System according to claim 1, wherein the humidifying unit is arranged to moisten only one side of the sheet when the sheet is horizontally transferred through the humidifying unit.

7. System according to claim 1, wherein the humidifying unit comprises at least one of
an immersion unit for immersing the at least one side of the sheet in the moistening agent,
a spraying unit for spraying the moistening agent on the at least one side of the sheet,
a steam unit for applying the moistening agent onto the at least one side of the sheet, and
a roll transfer unit for transferring the moistening agent from a reservoir onto the at least one side of the sheet.

8. System according to claim 1, further comprising at least one of
a pre-drying unit for drying the sheet before reaching the forming unit, preferably for drying at least part of the sheet, wherein the control unit is further configured to control the pre-drying unit based on these values,
a final drying unit for drying the pod element,
a filling unit for placing an amount of a brewing material into the pod cavity of the pod element,
a joining unit for joining a closing element to the pod element to close the pod cavity.

9. System according to claim 8, wherein the closing element is
a lid, or
another one of the pod elements.

10. System according to claim 9, wherein the system comprises
two of the shaping lines, each for forming a pod element, and
the joining unit for joining the two pod elements to form the pod cavity.

11. System according to claim 1,
wherein the sheet has gas barrier properties.

12. A method for manufacturing a compostable pod for brewing products, comprising:
transferring a sheet made of a biodegradable cellulose-based material along a transfer direction through the system;
moistening at least one side of said sheet with a moistening agent;
shaping part of the moistened sheet into a three-dimensional shape to form a pod element defining a pod cavity;
visually sensing a level of humidity of at least a section of the moistened sheet;
receiving values related to the sensed level of humidity; and
controlling the moistening of the at least one side of the sheet based on these values.

13. Method according to claim 12, wherein the step of visually sensing comprises:
capturing a visual image of at least the section of the moistened sheet representing the level of humidity.

14. Method according to claim 12, wherein the step of controlling the moistening comprises:
comparing the received values with defined reference values, and
controlling the moistening based on the comparison between the received values and the defined reference values.

15. Method according to claim 12, further comprising at least one of:
placing an amount of a brewing material into the cavity of the pod element;
joining a closing element to the pod element to close the cavity.

* * * * *